United States Patent
Fusenig et al.

(10) Patent No.: US 12,069,094 B2
(45) Date of Patent: Aug. 20, 2024

(54) METHOD AND DEVICE FOR CONFIGURING AN ACCESS PROTECTION SYSTEM

(71) Applicant: Siemens Aktiengesellschaft, Munich (DE)

(72) Inventors: Volker Fusenig, Trier (DE); Angela Schattleitner, Tuntenhausen (DE)

(73) Assignee: Siemens Aktiengesellschaft, Munich (DE)

( * ) Notice: Subject to any disclaimer, the term of this patent is extended or adjusted under 35 U.S.C. 154(b) by 350 days.

(21) Appl. No.: 17/276,579

(22) PCT Filed: Sep. 3, 2019

(86) PCT No.: PCT/EP2019/073423
§ 371 (c)(1),
(2) Date: Mar. 16, 2021

(87) PCT Pub. No.: WO2020/057958
PCT Pub. Date: Mar. 26, 2020

(65) Prior Publication Data
US 2022/0053025 A1    Feb. 17, 2022

(30) Foreign Application Priority Data
Sep. 18, 2018   (EP) ..................................... 18194992

(51) Int. Cl.
*H04L 29/06* (2006.01)
*H04L 9/40* (2022.01)

(52) U.S. Cl.
CPC ............. *H04L 63/20* (2013.01); *H04L 63/10* (2013.01)

(58) Field of Classification Search
CPC ..... H04L 63/20; H04L 63/10; H04L 63/0263; H04L 63/0227; H04L 63/101; H04L 63/145
(Continued)

(56) References Cited

U.S. PATENT DOCUMENTS 7,284,267 B1   10/2007 McArdle et al.
10,567,440 B2 *  2/2020 Bansal ................. H04L 63/205
(Continued)

FOREIGN PATENT DOCUMENTS

CN    103218472 A    7/2013
CN    103780601 A    5/2014
(Continued)

OTHER PUBLICATIONS

PCT International Search Report mailed Oct. 16, 2019 corresponding to PCT International Application No. PCT/EP2019/073423 filed Sep. 3, 2019.

*Primary Examiner* — Longbit Chai
(74) *Attorney, Agent, or Firm* — Schmeiser, Olsen & Watts LLP

(57) ABSTRACT

A computer-implemented method for configuring an access protection system which is suitable for regulating a data communication link of a computer-implemented application between a first computer network and a second computer network is provided. For this purpose, the computer-implemented application is run in the first computer network in a production environment or in an image of the first computer network in a test system. A data communication link of the computer-implemented application to the second computer network is determined by a sensor and a configuration rule is derived therefrom for the access protection system for permitting the data communication link of the computer implemented application between the first computer network and the second computer network in the production system. Also provided are a device, a test system, an access protection system, a computer program product and a computer-readable data carrier.

17 Claims, 3 Drawing Sheets

(58) Field of Classification Search
USPC .............................................................. 726/1
See application file for complete search history.

(56) References Cited

U.S. PATENT DOCUMENTS

| | | |
|---|---|---|
| 2007/0016945 A1 | 1/2007 | Bassett et al. |
| 2015/0135265 A1 | 5/2015 | Bagrin |
| 2018/0176261 A1 | 6/2018 | Bansal et al. |

FOREIGN PATENT DOCUMENTS

| | | | |
|---|---|---|---|
| CN | 105871930 A | | 8/2016 |
| EP | 3-163-802 A1 | * | 5/2017 |
| EP | 3-232-639 | * | 10/2017 |
| EP | 3232639 A1 | | 10/2017 |

* cited by examiner

METHOD AND DEVICE FOR CONFIGURING AN ACCESS PROTECTION SYSTEM

CROSS-REFERENCE TO RELATED APPLICATIONS

This application claims priority to PCT Application No. PCT/EP2019/073423, having a filing date of Sep. 3, 2019, which is based on EP Application No. 18194992.6, having a filing date of Sep. 18, 2018, the entire contents both of which are hereby incorporated by reference.

FIELD OF TECHNOLOGY

The following relates to a computer-implemented method and to an apparatus for configuring an access protection system which is suitable for regulating a data communication connection of a computer-implemented application between a first computer network and a second computer network. The following is also directed to an apparatus, a test system, an access protection system, a computer program product and a computer-readable data storage medium.

BACKGROUND

A communication connection between computer systems, computers or networks is typically protected by an access protection system, for example a firewall or security gateway, which typically controls the transmission of data packets from one network to another. Such an access protection system is generally securely configured according to the least-privilege principle, that is to say only communication which is required by a system downstream of the access protection system is permitted or enabled via the access protection system.

The definition of necessary communication connections and the corresponding configuration of the access protection system are generally carried out manually and can therefore be complicated and susceptible to errors, in particular in the case of agile software development.

SUMMARY

An aspect relates to simplifying the configuration of an access protection system which regulates a data communication connection between computers or computer networks.

According to a first aspect, embodiments of the invention relate to a computer-implemented method for configuring an access protection system which is suitable for regulating a data communication connection of a computer-implemented application between a first computer network and a second computer network, wherein
   the computer-implemented application is provided,
   an image of the first computer network is provided in a test system and the computer-implemented application is executed therein,
   a data communication connection, which is required when executing the computer-implemented application, between the image of the first computer network and the second computer network is determined by a sensor,
   a configuration rule for the access protection system for permitting the data communication connection of the computer-implemented application between the first computer network and the second computer network is derived on the basis of the data communication connection determined by the sensor,
   and
   the configuration rule for configuring the access protection system is output.

An advantage of embodiments of the present invention is that it is possible to automatically determine a configuration rule for an access protection system for communication between a first and a second computer network. For this purpose, a computer-implemented application, for example software or an app or an executable program, is executed and is used to determine which connections or communication relationships are required at the network level for the app or software with respect to a second computer network. In an embodiment, the computer-implemented application may be executed in a production environment comprising at least one first and/or one second computer network, or in a test system comprising at least one image of the first computer network. A production environment can be understood as meaning, in particular, the network environment with real conditions. A test system, also referred to as a test environment below, can be understood as meaning, in particular, a (software) development environment. The test system may be provided and/or configured in advance, in particular. An "image of a computer network" can be understood as meaning, in particular, a reconstruction of the computer network or of a part of the computer network comprising all relevant network components and connections, which is implemented in the test system, for example.

It is assumed, in particular, that a data communication connection, that is to say interchange or transmission and/or reception of data, is effected between the first computer network and the second computer network in a production environment via at least one access protection system, for example a firewall or a security gateway. At least one configuration rule is intended to be determined for this access protection system on the basis of the data communication connection or data traffic captured by a sensor. The configuration rule may comprise an access rule and is intended to be formulated, in particular, in such a manner that this data communication connection is allowed when executing the computer-implemented application in the production environment. A sensor may be, for example, a part of a network interface or of an access protection system or may be understood as meaning a separate apparatus which only forwards data traffic and records it in the process, in particular. A sensor may also be in the form of software, in particular, with the result that data traffic occurring between two computer networks, for example, can be inferred using the sensor and communication relationships can be derived therefrom.

The test system may be shielded or protected from other communication relationships, in particular. For example, the test system is a so-called "sandbox" environment. This has the advantage, in particular, that only those communications which are relevant to the computer-implemented application are effected in the test system. The effect, for example connection requests, of the communication carried out by the computer-implemented application can be recorded within the test system. A computer-implemented application can be executed in the test system without this damaging, changing or disrupting a system.

The image of the first computer network in the test system may be, in particular, similar to that in the production environment, for example in terms of network topology or architecture. The test system is configured, in particular, in such a manner that data communication coming from a computer-implemented application can be modeled or simulated and can be captured in this case by a sensor. The image of the first computer network may be connected to the second computer network, for example via a network interface, with the result that data communication can be carried out between the two networks and recorded. This has the advantage, in particular, that, on the one hand, a computer-implemented application is executed in a protected test system but, on the other hand, data communication with the second computer network can be analyzed under real conditions with respect to the second computer network.

At least one rule for an access protection system in the production environment is derived from a recorded data communication connection of the computer-implemented application. "Derive" can be understood as meaning, for example, "ascertain", "calculate", "acquire", "determine", "restrict", "deduce", "infer", "conclude", "extrapolate", "gather" or the like.

Unless stated otherwise in the following description, the terms "ascertain", "carry out", "provide", "effect", "calculate", "computer-aided", "compute", "establish", "generate", "configure", "reconstruct" and the like relate to actions and/or processes and/or processing steps which change and/or generate data and/or convert the data into other data, wherein the data may be represented or may be present as physical variables, in particular.

In connection with embodiments of the invention, "computer-aided" or "computer-implemented" may be understood as meaning, for example, an implementation of the method in which a processor carries out at least one method step of the method, in particular.

In connection with embodiments of the invention, a processor can be understood as meaning, for example, a machine or an electronic circuit. A processor may be, in particular, a main processor (central processing unit, CPU), a microprocessor or a microcontroller, for example an application-specific integrated circuit or a digital signal processor, possibly in combination with a storage unit for storing program instructions, etc.

In particular, the computer-implemented method may be implemented in a cloud, in which case both the production environment and the test system can be implemented in the cloud.

In one advantageous embodiment of the computer-implemented method, an image of the second computer network can be additionally provided in the test system, and the data communication connection of the computer-implemented application only between the image of the first computer network and the image of the second computer network can be determined by a sensor.

In particular, both the first computer network and the second computer network, to which the computer-implemented application, for example, establishes a communication connection, can be modeled in the test system. This has the advantage, for example, that any communication between the two networks takes place in a shielded environment, that is to say cannot be disrupted by unwanted communication. Furthermore, a plurality of second computer networks may also be modeled in the test system.

In one advantageous embodiment of the computer-implemented method, the configuration rule can be derived in such a manner that, according to the configuration rule, only a trusted and/or permitted data communication connection of the computer-implemented application is permitted via the access protection system.

As a result, a configuration rule for the access protection system can be derived according to the least-privilege principle, in particular. Only those connections of a computer-implemented application which are required and/or trusted for the application are implemented and recorded. The configuration rule can then advantageously permit only these connections.

In one advantageous embodiment of the computer-implemented method, a data communication connection from the second computer network or the image of the second computer network to the image of the first computer network can be prevented in the test system.

In an embodiment, a data communication connection, for example access by other software or another computer-implemented application, into the image of the first computer network cannot be enabled or allowed in the test system. This can be achieved, for example, by only predefined computer-implemented applications being executed in the test system.

In one advantageous embodiment of the computer-implemented method, the data communication connection of the computer-implemented application between the image of the first computer network and the second computer network or the image of the second computer network can be simulated in the test system.

The data communication connection between the computer networks and, in particular, external communication can be simulated in the test system at least partially by a computer-aided simulation of the data communication connection. For example, a request from a computer-implemented application can be processed only with a simulated response, for example simulated return values. In addition, only a part of a computer network may be modeled in the test system, in particular, wherein communication relationships are at least partially simulated.

In one advantageous embodiment of the computer-implemented method, a data communication connection of the computer-implemented application, which is effected between the first computer network and the second computer network via more than one access protection system, can be determined by more than one sensor, and a configuration rule for permitting the data communication connection of the computer-implemented application can be respectively derived for each of these access protection systems.

For example, the data communication connection implemented between the image of the first computer network and the second computer network or the image of the second computer can be effected in the test system via more than one network node, for example a router, with respect to the second computer network. The corresponding network nodes and the corresponding communication via the nodes can be determined by at least one sensor, for example, and a configuration rule can be respectively derived for each of the network nodes.

In one advantageous embodiment of the computer-implemented method, the type of data communication connection of the computer-implemented application can be determined.

Information or details, for example a communication protocol, relating to the data communication can be recorded by a sensor, for example.

In one advantageous embodiment of the computer-implemented method, a communication characteristic can be determined from the type of data communication connection of the computer-implemented application and a configuration rule for the access protection system can be derived therefrom.

For example, a communication protocol can be used as a basis for determining what type of communication is intended to be permitted via the access protection system and what type of communication is typical. The access protection system can therefore check, for example, whether current communication is typical.

In one advantageous embodiment of the computer-implemented method, the configuration rule can be provided by the test system in a production environment, which is at least similar to the test system, for the purpose of configuring the access protection system.

In an embodiment, the configuration rule which has been determined from the recording of the data communication connection of the computer-implemented application in the test system can be provided automatically in the production environment for the purpose of configuring the access protection system.

In one advantageous embodiment of the computer-implemented method, the access protection system can be configured according to the configuration rule.

In particular, the access protection system can be configured, that is to say set or programmed, automatically according to the configuration rule.

In one advantageous embodiment of the computer-implemented method, a configuration instruction for configuring the access protection system according to the configuration rule can be determined and output for a configuration of the access protection system.

For example, it is possible to create a computer-readable configuration script which comprises the configuration rule and can be used to control the access protection system in order to configure the latter in the production environment according to the configuration rule.

In one advantageous embodiment of the computer-implemented method, the configuration rule and/or the configuration instruction can be digitally signed.

A digital signature may comprise, for example, an item of time information, information relating to the test system or the name of a user or of the computer-implemented application. The digital signature may therefore be used as integrity protection, in particular. The configuration rule and/or the configuration instruction can be verified, in particular, by the digital signature, for example before they are implemented in the production environment.

According to a further aspect, embodiments of the invention relate to an apparatus for configuring an access protection system which is suitable for regulating a data communication connection of a computer-implemented application between a first computer network and a second computer network, comprising:
  a first provision module which is configured to provide the computer-implemented application and an image of the first computer network in a test system,
  an application module which is configured to execute the computer-implemented application in the image of the first computer network in the test system,
  a sensor which is configured to determine a data communication connection, which is required when executing the computer-implemented application, between the image of the first computer network and the second computer network,
  a derivation module which is configured to derive a configuration rule for the access protection system for permitting the data communication connection of the computer-implemented application between the first computer network and the second computer network on the basis of the data communication connection determined by the sensor, and
  an output module which is configured to output the configuration rule for configuring the access protection system.

In particular, the sensor can capture the data communication connection of the computer-implemented application in the test system or in the production environment.

In one advantageous embodiment, the apparatus may comprise a configuration module which is configured to configure the access protection system according to the configuration rule.

The apparatus is configured, in particular, to carry out the steps of a computer-implemented method according to embodiments of the invention.

According to a further aspect, embodiments of the invention relates to a test system which comprises an apparatus according to embodiments of the invention.

In an embodiment, the test system, also referred to as a test environment, can be coupled to a configuration module.

According to a further aspect, embodiments of the invention relates to an access protection system which is suitable for regulating a data communication connection of a computer-implemented application between a first computer network and a second computer network and is configured according to a method according to embodiments of the invention.

Embodiments of the invention also relate to a computer program product (non-transitory computer readable storage medium having instructions, which when executed by a processor, perform actions) which can be directly loaded into a programmable computer, comprising program code parts which are suitable for carrying out the steps of a method according to embodiments of the invention, and to a computer-readable data storage medium, on which the computer program product is stored.

In particular, a computer program product according to embodiments of the invention can be provided by a network service, a computer system, a server system, a distributed computer system, a cloud-based computer system and/or a virtual computer system. The provision can be effected, for example, as a download in the form of a program data block and/or an instruction data block, for example, in the form of a file, in particular in the form of a download file, of the complete computer program product. Such a computer program product is read in, for example, using a provision apparatus, in particular in the form of a computer-readable data storage medium, and executes the program instructions, with the result that the method according to embodiments of the invention is carried out on a computer.

BRIEF DESCRIPTION

Some of the embodiments will be described in detail, with references to the following Figures, wherein like designations denote like members, wherein.

DETAILED DESCRIPTION

Figure 1:
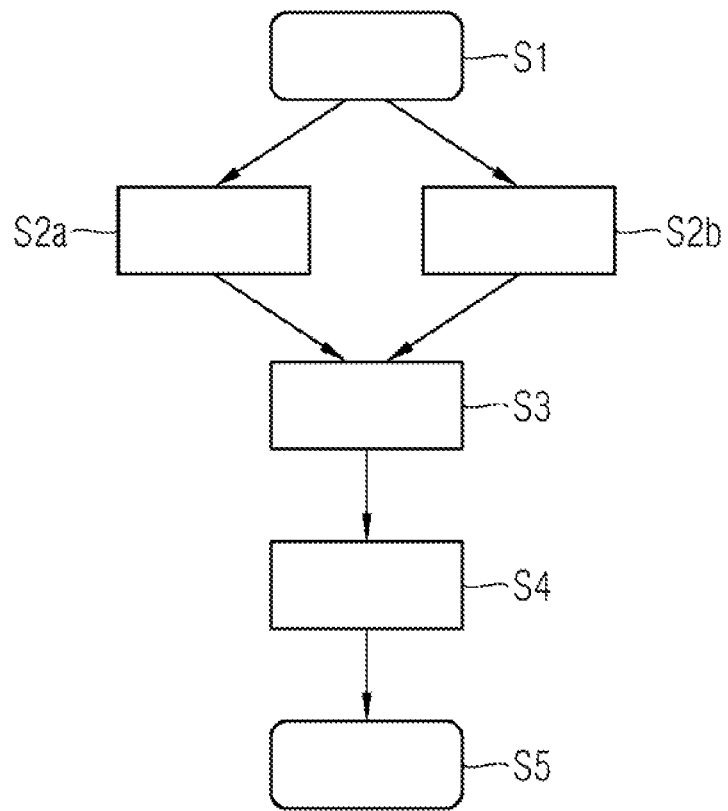
FIG. 1 shows a flowchart of a method according to embodiments of the invention.

FIG. 1 shows a flowchart of a method according to embodiments of the invention for configuring an access protection system which regulates or controls a data communication connection of a computer-implemented application, for example an app or software, between a first computer network and a second computer network, for example restricts access or lets data packets through. The first computer network is connected to the second computer network, for example via the access protection system, for example a firewall. The software or app can be executed, in particular, in the first computer network and can require a data communication connection to the second computer network. For example, a computer-implemented application may control a technical system in the first computer network, wherein the computer-implemented application requests parameter data from a database which is arranged in the second computer network. According to embodiments of the invention, at least one configuration rule for configuring the access protection system is intended to be determined. The method can be carried out in a production environment or in a test environment, also referred to as a (software) development environment, which at least partially resembles the production environment, in particular. A computer-implemented application can be tested or developed, in particular, in the test system, that is to say in a test environment, and can then be installed in the production environment. The production environment is, in particular, the software environment where the computer-implemented application is fully executed. In an embodiment, the test system is shielded, that is to say only trusted and/or necessary communication connections are allowed, for example. Data communication into the test system can be prevented, in particular, or only data communication from the test system may be enabled.

In the first step S1 of the method, a computer-implemented application is provided. At least one configuration rule for the access protection system is then intended to be determined, which configuration rule allows a data communication connection, which starts from the computer-implemented application, between the first and second computer networks.

In the next step S2a or S2b, the computer-implemented application is executed in the production environment or in the test environment. In step 2a, the computer-implemented application is executed in the first computer network, that is to say in the production environment. In step 2b, an image of the first computer network or of at least one part of the first computer network is alternatively provided in a test environment and the computer-implemented application is executed therein. In an embodiment, the image of the first computer network in the test environment is similar in terms of the network topology of the first computer network in the production environment. The first computer network and the test system are connected to the second computer network.

In particular, the computer-implemented application is executed in such a manner that all communication relationships with other applications in the first computer network or in the image of the first computer network and with respect to the second computer network, which are necessary or desired during execution, can be determined.

In the next step S3, a sensor is used to record any required data communication connection of the computer-implemented application in the first computer network or in the image of the first computer network and/or any connection to the second computer network, that is to say it is determined, for example, which data communication connection is established from the computer-implemented application. The type of data communication connection, for example the communication protocol, can be additionally concomitantly recorded, wherein typical access patterns can be derived from this information, for example. In particular, the data communication connection between the first computer network and the second computer network, which runs in the production environment via the access protection system to be configured, is intended to be captured. For example, a sensor can be installed at the location of the access protection system and can therefore determine the data communication connection.

In the next step S4, at least one configuration rule for the access protection system is derived from the data communication connection between the two computer networks which is captured by the sensor and is needed to execute the computer-implemented application. A communication characteristic can be determined from the type of data communication, for example which data are transmitted, requested or sent. In order to permit only the data communication connection which is required for the computer-implemented application between the first and second computer networks, for example, it is possible to create a configuration rule for the access protection system which does not permit any further data traffic. In the shielded test system, only a trusted data communication connection from a first computer network to a second computer network can therefore be captured, in particular, and configuration rules for access protection systems can be accordingly created. In other words, in an embodiment, the test environment can be shielded, with the result that only the required data communication connection of a computer-implemented application is effected. This is determined by a sensor and a configuration rule is derived.

In step S5, the derived configuration rule is output. The configuration rule can be transmitted from the test system to the production environment, with the result that a corresponding access protection system there can be configured according to the configuration rule.

In addition, a configuration instruction, for example a configuration script, can be created according to the configuration rule, for example. This can be executed by a configuration module, for example, with the result that the access protection system is configured according to the configuration rule.

The configuration rule and/or the configuration instruction can also be digitally signed in order to prove its origin or integrity, for example.

Figure 2:
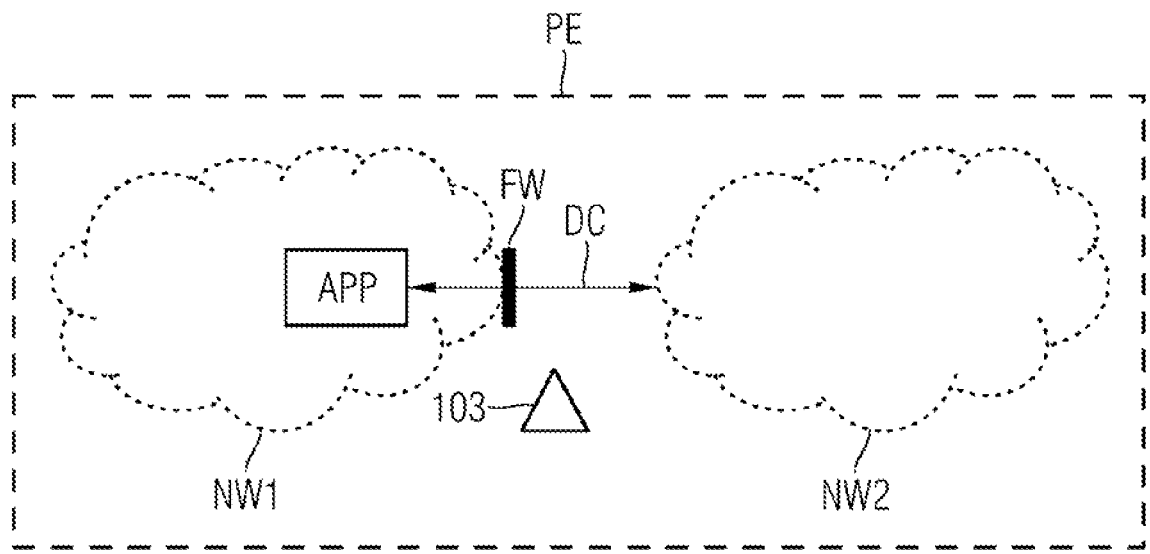
FIG. 2 shows a schematic illustration of an exemplary embodiment of a method according to embodiments of the invention.

FIG. 2 schematically shows an exemplary embodiment of a computer-implemented method according to embodiments of the invention. A production environment PE is shown. The production environment PE may be interpreted, in particular, as a real network environment. The production environment PE comprises a first computer network NW1 and a second computer network NW2 which are connected to one another via a communication connection for transmitting data communication DC of a computer-implemented application APP. An access protection system FW, for example a firewall, can regulate and/or control the data communication DC. For this purpose, at least one configuration rule for an access protection system FW according to embodiments of the invention is intended to be determined in accordance with a method according to embodiments of the invention. The configuration rule may be configured in such a manner that the data communication DC of the computer-implemented application APP is permitted, in particular.

For this purpose, the computer-implemented application APP is executed in the first computer network NW1, and the data communication DC of the computer-implemented application APP to the second computer network NW2 is recorded by a sensor 103. A rule can be derived on the basis of the determined data communication connection DC and can be output as a configuration rule for the access protection system FW. For example, the configuration rule comprises only access rights for this particular data communication connection DC and therefore excludes all further possible data connections.

In particular, the determined configuration rule comprises setting values for the access protection system FW which are used to configure the access protection system FW in such a manner that the data communication connection DC can be implemented via the access protection system, that is to say is not blocked or restricted.

Figure 3:
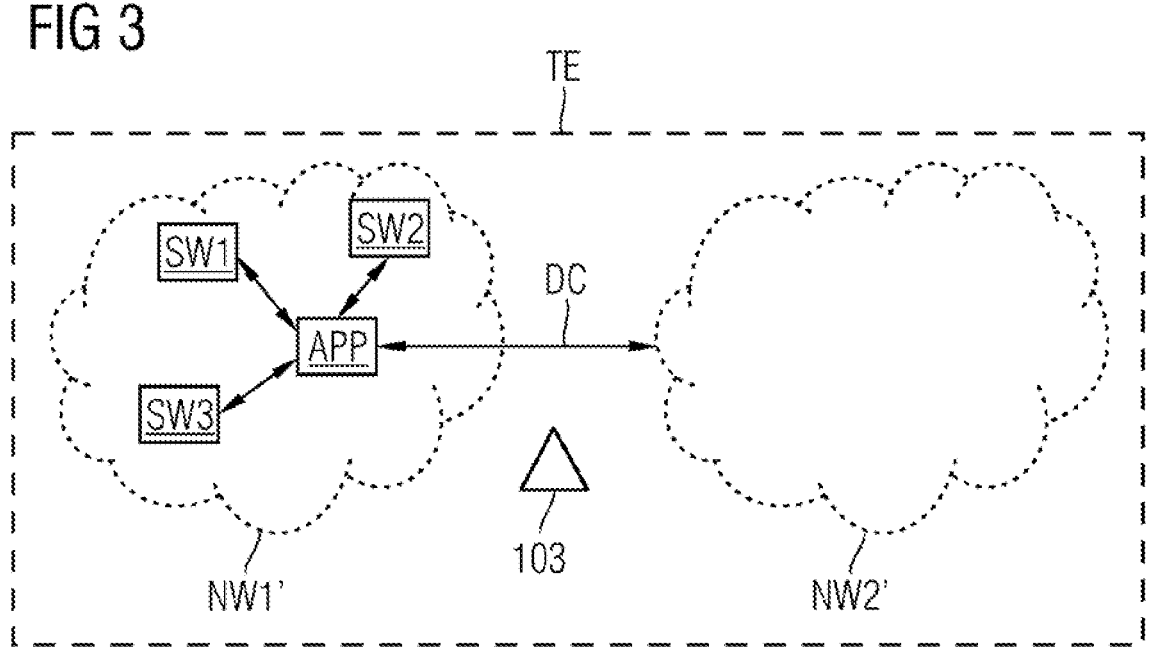
FIG. 3 shows a second schematic illustration of a second exemplary embodiment of a method according to embodiments of the invention.

FIG. 3 schematically shows a second exemplary embodiment of a method according to embodiments of the invention. A test system TE, for example a sandbox, is shown. In order to determine a configuration rule for an access protection system which regulates a data communication connection between a first computer network and a second computer network, an image of the two computer networks NW1', NW2' is respectively provided in the test system TE. For example, the first computer network is a secure network and the second computer network is a public network, with the result that the communication of a computer-implemented application APP from the first computer network to the second computer network is intended to be regulated.

The computer-implemented application APP is executed in the test system TE. For example, the computer-implemented application APP interchanges data with different software SW1, SW2, SW3 in the first computer network NW1' and with the computer network NW2'. Alternatively, at least one part of this data communication connection DC may also be simulated by a computer-aided simulation, with the result that only simulated data are returned in the event of a request, for example.

A sensor 103, which may be set up in the test system instead of an access protection system for example, can be used to capture, in particular, the data communication connection DC of the computer-implemented application APP between the first computer network NW1' and the second computer network NW2'. A configuration rule for an access protection system in the production environment can be determined on the basis of the recorded data communication DC. In an embodiment, a configuration rule can be derived according to the least-privilege principle.

Figure 4:
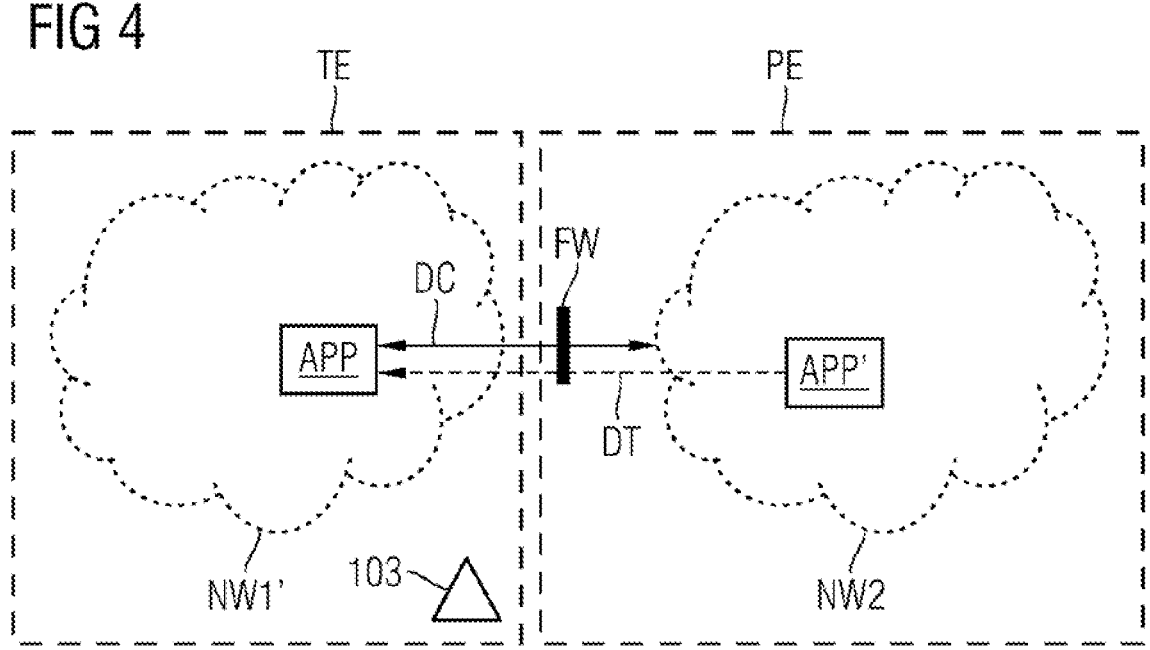
FIG. 4 shows a third schematic illustration of a third exemplary embodiment of a method according to embodiments of the invention.

FIG. 4 shows a schematic illustration of a further exemplary embodiment of a computer-implemented method according to embodiments of the invention. An image of a first computer network NW1' in a test environment TE is shown. The test environment TE is connected to the production environment PE via a communication connection, with the result that data communication DC of the computer-implemented application APP between the image of the first computer network NW1' and the second computer network NW2 is enabled, in particular. In addition, a data transmission DT of another computer-implemented application APP' from the second computer network NW2 into the test environment TE can be prevented or restricted. For example, the transmission of data from the second network NW2 into the test environment TE therefore cannot be allowed. For example, only a connection to the Internet can be enabled for the test environment.

The production environment PE also comprises a firewall FW which regulates, controls and/or restricts the data streams between the first computer network NW1 and the second computer network NW2. In order to determine a configuration rule for the firewall FW, a computer-implemented application APP is executed in the image of the first computer network NW1' in the test environment TE and the required data communication DC is recorded by the sensor 103.

At least one configuration rule is then derived on the basis of the recorded data communication DC. In addition, it is possible to additionally create a configuration script which comprises a configuration instruction for the firewall FW according to the configuration rule.

Figure 5:
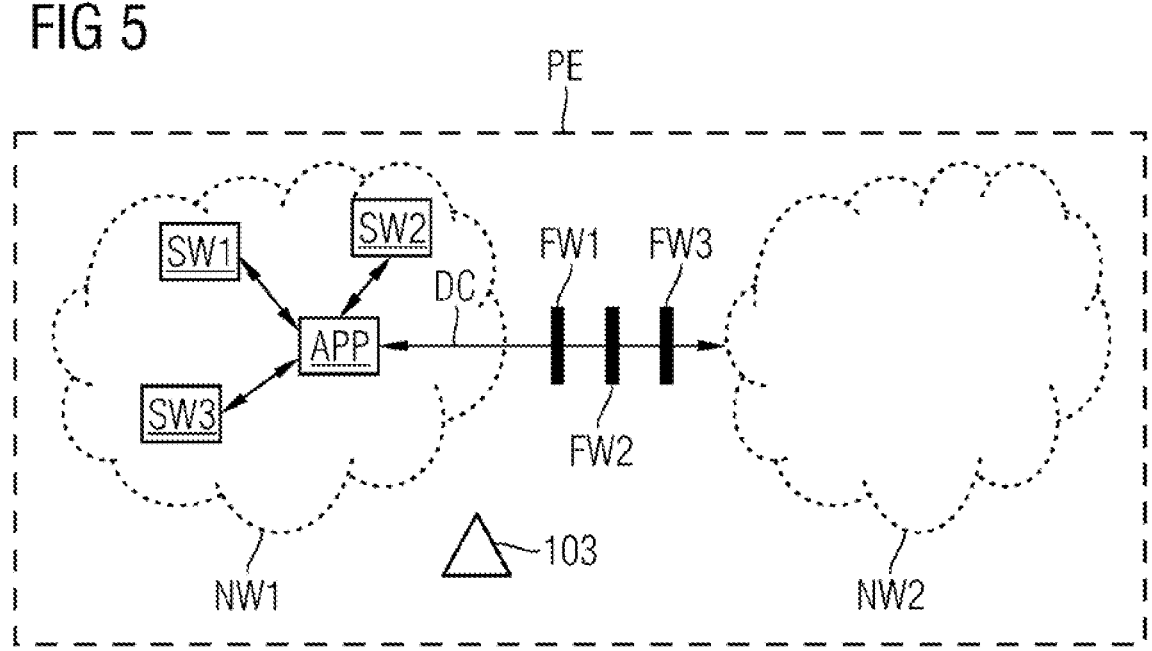
FIG. 5 shows a fourth schematic illustration of a fourth exemplary embodiment of a method according to embodiments of the invention.

FIG. 5 shows a further exemplary embodiment of a method according to embodiments of the invention. A computer-implemented application APP is executed in the first computer network NW1 in order to capture the data communication DC to the second computer network NW2 of the production environment PE. In this case, the data communication DC between the two computer networks NW1, NW2 in the production environment PE takes place via a plurality of network nodes, for example routers, for whose access protection systems FW1, FW2, FW3 a configuration rule is respectively intended to be determined. For this purpose, the individual network nodes and the data communication taking place via the nodes between the first computer network NW1 and the second computer network NW2 can be first of all determined by a sensor 103. A configuration rule is then derived for each access protection system FW1, FW2, FW3 and is then implemented.

Figure 6:
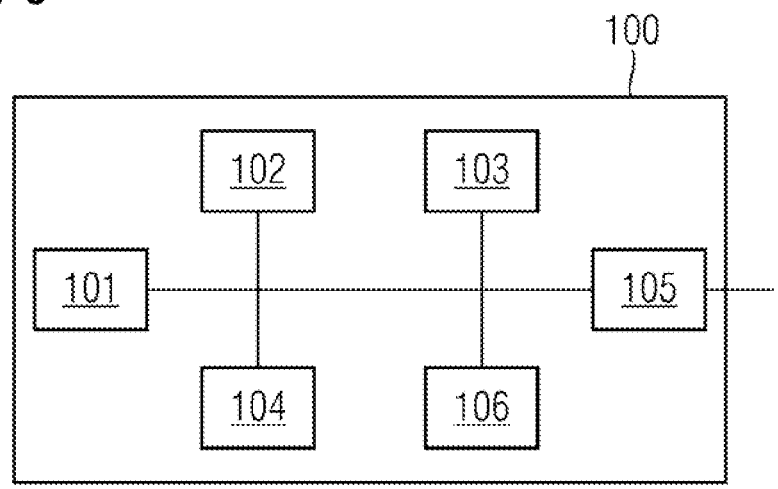
FIG. 6 shows a schematic illustration of an exemplary embodiment of an apparatus according to embodiments of the invention in a block diagram.

FIG. 6 shows an exemplary embodiment of an apparatus 100 according to embodiments of the invention for configuring an access protection system which is suitable for regulating data communication of a computer-implemented application between a first computer network and a second computer network. In an embodiment, the apparatus is coupled to an access protection system according to embodiments of the invention. The apparatus 100 comprises a provision module 101, an application module 102, at least one sensor 103, a derivation module 104, an output module 105 and a configuration module 106. The apparatus may also comprise at least one processor which is configured to carry out at least one of the steps of a method according to embodiments of the invention.

The provision module 101 is configured to provide a computer-implemented application which is intended to be executed in the first computer network. The provision module may also provide an image of the first computer network and/or an image of the second computer network in a test system. The application module 102 is configured to execute the computer-implemented application in the production environment or in the test system, with the result that the sensor 103 can be used to record the data communication connection of the computer-implemented application APP between the first computer network and the second computer network. The derivation module 104 is configured to derive a configuration rule for an access protection system in the production environment on the basis of the recorded data communication. The determined configuration rule is transmitted to the configuration module 106, for example, by the output module 105. The configuration module 106 is configured to configure an access protection system according to the configuration rule and/or by a configuration instruction. In particular, a configuration module can configure an access protection system according to the configuration rule in such a manner that only trusted and/or necessary data traffic is permitted via the system.

The apparatus 100 may comprise, in particular, at least one processor in order to carry out or implement the method according to embodiments of the invention. In particular, the test system can be implemented in a cloud environment which is connected to the production environment via a communication connection.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for configuring an access protection system for regulating a data communication connection of a computer-implemented application between a first computer network and a second computer network, comprising:

providing the computer-implemented application;

providing a reconstruction of the first computer network in a test system and executing the computer-implemented application therein, wherein the reconstruction of the first computer network includes network components and connections, wherein executing the computer-implemented application in the test system results in a trusted data communication connection from the reconstruction of the first network to the second computer network, wherein the test system is shielded from communication relationships other than the trusted data communication connection resulting from executing the computer-implemented application, data communication into the test system is prevented, and only communication from the test system is enabled;

determining, by a sensor, the trusted data communication connection resulting when executing the computer-implemented application, between the reconstruction of the first computer network and the second computer network, in the test system, wherein a type of data communication connection of the computer-implemented application is determined, and wherein a communication characteristic is determined from the type of data communication connection of the computer-implemented application;

deriving a configuration rule for the access protection system for permitting the data communication connection of the computer-implemented application between the first computer network and the second computer network on the basis of the trusted data communication connection determined by the sensor in the test system, including the type of data communication connection and the communication characteristic, wherein the configuration rule is derived in such a manner that, according to the configuration rule, only trusted and/or permitted data communication connections of the computer-implemented application are permitted via the access protection system and further data traffic is not permitted;

and outputting the configuration rule for configuring the access protection system.

2. The computer-implemented method as claimed in claim 1, wherein a reconstruction of the second computer network is additionally provided in the test system, and the data communication connection of the computer-implemented application only between the reconstruction of the first computer network and the reconstruction of the second computer network is determined by the sensor.

3. The computer-implemented method as claimed in claim 1, wherein a data communication connection from the second computer network is prevented in the test system.

4. The computer-implemented method as claimed in claim 1, wherein the data communication connection of the computer-implemented application between the reconstruction of the first computer network and the second computer network is simulated in the test system.

5. The computer-implemented method as claimed in claim 1, wherein a data communication connection of the computer-implemented application, which is effected between the first computer network and the second computer network via more than one access protection system, is determined by more than one sensor, and a respective configuration rule for permitting the data communication connection of the computer-implemented application is respectively derived for each of these access protection systems.

6. The computer-implemented method as claimed in claim 1, wherein the configuration rule is provided by the test system in a production environment, which is at least similar to the test system, for the purpose of configuring the access protection system.

7. The computer-implemented method as claimed in claim 1, wherein the access protection system is configured according to the configuration rule.

8. The computer-implemented method as claimed in claim 1, wherein a configuration instruction for configuring the access protection system according to the configuration rule is determined and output for a configuration of the access protection system.

9. The computer-implemented method as claimed in claim 1, wherein the configuration rule is digitally signed.

10. An access protection system for regulating a data communication connection of a computer-implemented application between a first computer network and a second computer network, the access protection system configured according to the method as claimed in claim 1.

11. A computer program product, comprising a computer readable hardware storage device having computer readable program code stored therein, said program code executable by a processor of a computer system to implement the method as claimed in claim 1.

12. A computer-readable data storage medium, on which the computer program product as claimed in claim 11 is stored.

13. The computer-implemented method as claimed in claim 1, wherein a data communication connection from the image of the second computer network to the reconstruction of the first computer network is prevented in the test system.

14. The computer-implemented method as claimed in claim 1, wherein the data communication connection of the computer-implemented application between the reconstruction of the first computer network and the reconstruction of the second computer network is simulated in the test system.

15. An apparatus for configuring an access protection system for regulating a data communication connection of a computer-implemented application between a first computer network and a second computer network, comprising:
- at least one hardware processor;
- a first provision module which is configured to provide the computer-implemented application and a reconstruction of the first computer network in a test system, wherein the reconstruction of the first computer network includes network components and connections, wherein executing the computer-implemented application in the test system results in a trusted data communication connection from the reconstruction of the first network to the second computer network, wherein the test system is shielded from communication relationships other than the trusted data communication connection resulting from executing the computer-implemented application, data communication into the test system is prevented, and only communication from the test system is enabled;
- an application module which is configured to execute the computer-implemented application in the reconstruction of the first computer network in the test system;
- a sensor which is configured to determine the trusted data communication connection resulting when executing the computer-implemented application, between the reconstruction of the first computer network and the second computer network, in the test system, wherein a type of data communication connection of the computer-implemented application is determined, and wherein a communication characteristic is determined from the type of data communication connection of the computer-implemented application;
- a derivation module which is configured to derive a configuration rule for the access protection system for permitting the data communication connection of the computer-implemented application between the first computer network and the second computer network on the basis of the trusted data communication connection determined by the sensor in the test system, including the type of data communication connection and the communication characteristic, wherein the configuration rule is derived in such a manner that, according to the configuration rule, only trusted and/or permitted data communication connections of the computer-implemented application are permitted via the access protection system and further data traffic is not permitted; and
- an output module which is configured to output the configuration rule for configuring the access protection system.

16. The apparatus as claimed in claim 15, comprising a configuration module which is configured to configure the access protection system according to the configuration rule.

17. A test system which comprises an apparatus as claimed in claim 15.

* * * * *